United States Patent [19]
Pippert

[11] 3,719,366
[45] March 6, 1973

[54] HETEROGENEOUS LIP-TYPE PACKINGS

[75] Inventor: Aaron J. Pippert, Houston, Tex.
[73] Assignee: Utex Industries, Inc., Houston, Tex.
[22] Filed: May 26, 1971
[21] Appl. No.: 147,027

[52] U.S. Cl..............277/205, 277/212 C, 277/230, 277/233
[51] Int. Cl. ..............................................F16j 15/32
[58] Field of Search......277/227, 229, 230, 231, 233, 277/205, 206

[56] References Cited

UNITED STATES PATENTS

| 612,687 | 10/1898 | Van Den Bosch | 277/212 C |
| 2,677,581 | 5/1954 | Taylor | 277/212 C |
| 3,219,503 | 11/1965 | Blair | 277/205 |
| 3,419,280 | 12/1968 | Wheeler | 277/205 |
| 3,501,157 | 3/1970 | Doutt | 277/205 |

Primary Examiner—Joseph R. Leclair
Assistant Examiner—Robert L. Smith
Attorney—Ralph R. Browning

[57] ABSTRACT

A packing comprised of an annular body having a sealing section and a reinforcing section in which the sealing section which is of a resilient material has at least one sealing lip and the reinforcing section is made up of a strip of fabric wound into a helix with the convolutions of the helix superimposed upon one another and bonded together to form an integral section. The threads of the fabric in the strip are disposed obliquely to the opposed edges of the strip such that when the strip is wound into the helix, substantially the ends of the threads are exposed to the wearing surfaces of the reinforcing section. The invention also includes a method of manufacturing the packing in which the sealing section, having the sealing lip, is formed from a suitable resilient material and is then bonded to the reinforcing section which has been formed by winding the strip of fabric into a helix with the convolutions superimposed upon one another and then bonding together the convolutions.

8 Claims, 6 Drawing Figures

PATENTED MAR 6 1973

3,719,366

AARON J. PIPPERT
INVENTOR.

BY Ralph R. Browning
ATTORNEYS

HETEROGENEOUS LIP-TYPE PACKINGS

BACKGROUND OF THE INVENTION

The present invention relates to packings and more particular to packings for use in dynamic sealing. More particularly, the present invention relates to heterogeneous, lip-type packings such as those used with slush pump pistons.

Packings employed to seal around slush pump pistons and other similar type systems are subjected to extreme pressures on the working stroke and to a suction or vacuum on the return stroke. Accordingly, packings used on these systems must be constructed so as to withstand large stresses and reversal of pressures as well. Packings such as those shown in U.S. Pat. Nos. 2,189,839 and 2,267,882, in general comprise, annular bodies in which the sealing portion of the packing has a radially outward projecting lip which seals against the inside surface of the liner in which the piston is confined. The sealing section of the packing is generally made of a resilient material such as natural or synthetic rubber or some other such polymeric material either natural or synthetic having the required resiliency. Because of the fact that the packing is subjected to such high pressures, it is usual practice, as shown in the above noted patents, to provide a reinforcing section which in the past has been in the form of layers of a suitable fabric bonded together. The reinforcing section of the packing is generally confined to an area on the packing ring where the pressure imparted to the packing is transferred to the mounting used to secure the packing to the piston. The inherent resiliency of the sealing lip of the packing permits the lip to be forced against the inside surface of the piston liner by the pressure exerted in the working stroke. However, the sealing portion of the packing, being inherently resilient, is also subject to extrusion particularly in the working stroke. This extrusion of the sealing lip reduces the sealing efficiency of the packing and cuts the life of the packing.

In order for a dynamic packing of the type under consideration to operate effectively, it must be designed and installed such that it can undergo expansion and contraction freely, i.e., it must be allowed to breathe. The use of the fabric reinforcing section aids both in reducing extrusion of the resilient portion of the packing and aids breathing of the packing while at the same time contributing to the life of the packing.

Heretofore, several methods of manufacturing the reinforcing section of heterogeneous, lip-type, dynamic packings have been employed. In one method, annular pieces of the fabric are stamped out of sheets of the fabric, layered together to the desired thickness and then bonded together. In another method strips of the material are cut, formed into an annular piece layered to the desired thickness and then bonded together. In both of these methods, the reinforcing section will contain threads of the fabric which are disposed longitudinally or tangentially to the wearing surfaces of the packing and which are consequently susceptable to sloughing off as the seal wears. Moreover, the wearing of the seal will be uneven because the longitudinal disposition of the fabric threads occurs at every 90° such that the seal will tend to undergo selective wearing at these points. Furthermore, in the case of reinforcing sections prepared by the above described method of stamping annular pieces of fabric, there is excessive waste of the fabric. While the prior art as shown for example by U.S. Pat. Nos. 487,019 and 24,569, discloses methods of manufacturing seals and the like from fabric wherein the problem of threads longitudinally disposed to the wearing surfaces is avoided, none of the prior art teaches the manufacture of dynamic packings of the type under consideration wherein this problem has been overcome.

SUMMARY OF THE INVENTION

It is therefore an object of the present invention to provide an improved packing.

It is a further object of the present invention to provide an improved packing of the lip type for use in dynamic sealing applications.

Still a further object of the present invention is to provide a heterogeneous, lip-type, dynamic packing which allows the packing to breathe uniformly and which reduces the extrusion of the flexible sealing portion of the packing.

A further object of the present invention is to provide an improved packing comprised of a resilient sealing section and a fabric reinforcing section which is more economical to manufacture.

An important object of the present invention is to provide an improved packing for use in dynamic systems which has better wearability and in which the wearing is uniform.

Yet another object of the present invention is to provide a method for manufacturing a lip-type heterogeneous seal for use in dynamic sealing applications.

These and other objects of the present invention will become apparent from the drawings, the descriptions given herein, and the appended claims. In one embodiment, the present invention provides a packing comprising an annular body having a sealing section and a reinforcing section bonded together. The sealing section comprises a resilient material and at least one sealing lip, while the reinforcing section comprises at least one fabric and is formed from superimposed convolutions of a strip of the fabric. The threads of the strip are disposed obliquely to the opposed edges of the strip.

In another embodiment, the present invention provides a method for manufacturing a packing having a sealing section and a reinforcing section by forming an annular sealing section having at least one sealing lip thereon from a suitable resilient material, forming an annular reinforcing section by winding a strip of fabric into a helix, the convolutions of which are superimposed upon one another, bonding together the convolutions and subsequently bonding the sealing section and the reinforcing section together. The threads of the strip from which the helix is formed are disposed obliquely to the opposed edges of the strip.

DESCRIPTION OF THE PREFERRED EMBODIMENTS

Figure 1:
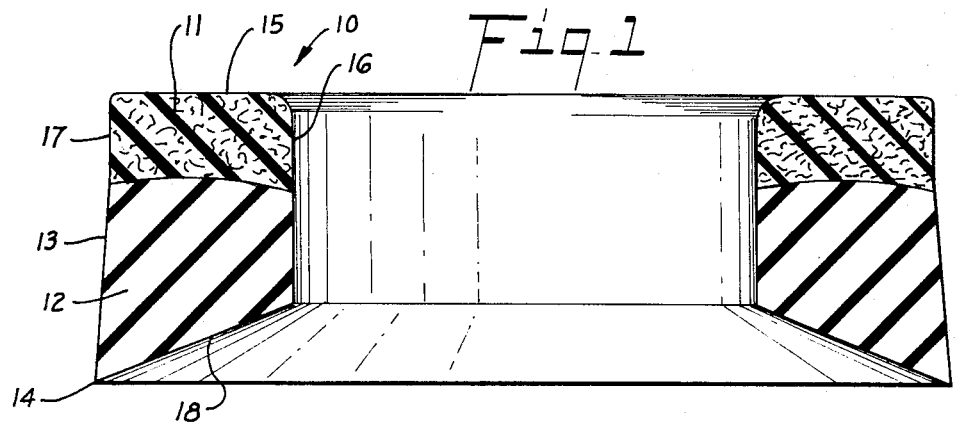
FIG. 1 is a cross-sectional view of a packing for a slush pump piston constructed in accordance with the present invention.
Figure 4:
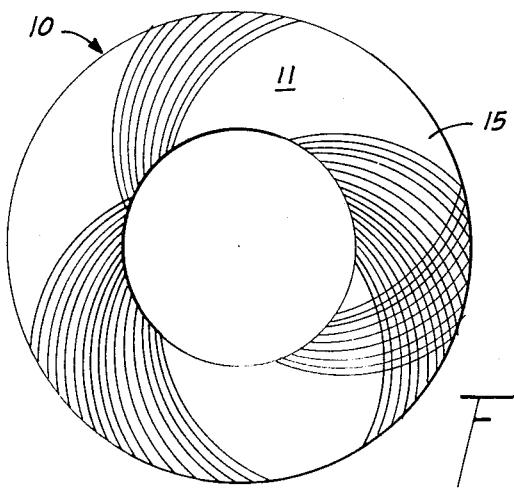
FIG. 4 is a top view of the packing ring shown in FIG. 1.

Referring now to FIGS. 1 and 4, there is shown a packing for use with slush pump pistons, particularly of the type which are used in maintaining a circulation of the slush, drilling mud or fluid in the rotary system of drilling wells. The packing, shown generally at 10, is seen to comprise an annular body having a reinforcing section 11 and a sealing section 12. The outer peripheral surface 13 of sealing section 12 flares outwardly such that a sealing lip 14 is formed on packing 10. The base 15 of packing 10 which is formed on one surface of reinforcing section 11 forms an abutment face when the packing is secured to a piston flange or other such mounting. The circumferentially extending lip 14 is generally slightly oversized with respect to the inside diameter of the liner in which the packing is confined so as to effect a sealing between the lip 14 and the surface of the liner in which the piston reciprocates. When placed in use, packing 10 will have base 15 and the inner peripheral surface 16 of reinforcing section 11 abutting against a flange or a similar such mounting secured to the piston. As the piston is reciprocated, outer peripheral surface 17 of reinforcing section 11 and inner peripheral surface 16 of reinforcing section 11 will be subjected to the most wear except of course for sealing lip 14 which is in frictional contact with the inside surface of the liner. Sealing section 12 is tapered on its inner surface so as to form a frustro conical surface 18, surface 18 terminating in lip 14 at its base.

Sealing section 12 will generally be comprised of a homogeneous, resilient material such as natural or synthetic rubber or some other such natural or synthetic polymer. Typical synthetic polymeric materials include polychlorophrene, styrene-butadiene rubbers, styrene-acrylonitrile-butadiene terpolymers, fluoroelastomers such as co-polymers of vinylidine chloride and hexafluoropropylene and other such synthetic polymeric materials having sufficient resiliency and wearability.

Figures 2, 3, 5:
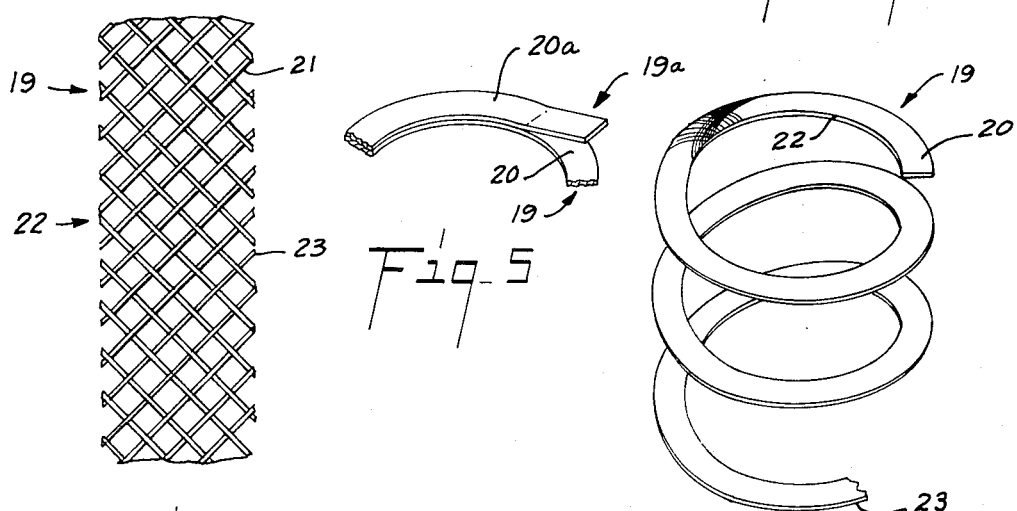
FIG. 2 is a planar view of a portion of a strip of fabric used in constructing the packings of the present invention.
FIG. 3 is an isometric view showing how a strip of fabric used in constructing the packings of the present invention is wound.
FIG. 5 is similar to FIG. 3 and shows the use of more than one fabric in forming a packing in accordance with the present invention.

The reinforcing section 11 of packing 10 is comprised of layers of fabric formed by winding a strip (shown generally as 19 in FIG. 3) of the particular fabric chosen in a helix, the number of convolutions of the helix depending on the desired thickness of the reinforcing section 11. By winding the strip 19 of fabric 20 in a continuous helix, an annular reinforcing section 11 is obtained which has no joints. This is desirable not only from a manufacturing point of view but from a durability point of view as well. The strip 19 used to form reinforcing section 11 has the threads 21 (FIG. 2) disposed therein such that they are at oblique angles to the respective opposed edges 22 and 23 of the strip 19. It will thus be observed, that there are no threads 21 which extend longitudinally or parallel to the opposed edges 22 and 23 of strip 19. Thus when strip 19 is wound into a helix as shown in FIG. 3, to form reinforcing section 11, only the ends of the threads 21 will appear at the wearing surfaces 16 and 17 of reinforcing section 11. In effect, there will be no threads 21 which will lie tangentially to the inner peripheral surface of packing 10. At substantially all points on the inner peripheral surface of packing 10, the ends of threads 21 will be exposed thus presenting a uniform surface resulting in even wear on surface 16. The same is true for surface 17, since substantially the ends of threads 21 will appear at that wearing surface.

To obtain strips 19 having the threads opposed obliquely to the respective edges thereof, a sheet of fabric can be cut on the bias in strips or the cloth itself can be woven on a bias or indeed the individual strips can be woven on a bias. It is to be understood that the strips can be single ply or multiple ply provided that the threads run on a bias or are obliquely disposed as described above.

While thus far the description has dealt with a single fabric in forming reinforcing section 11, it is to be understood that reinforcing section 11 can be formed from several fabrics by simply winding a strip of another fabric over a strip of the first fabric to form a laminated helix. Thus, in FIG. 5, there is seen a combination of strips 19 and 19a of fabrics 20 and 20a superimposed on one another to form a laminate of various fabrics. Moreover, any combination of various fabrics can be employed, such as for example alternate layers of two different types, or a single layer of one type fabric followed by two layers of a different type fabric, etc. It is only necessary in all these cases that the strips of fabric, regardless of how many different fabrics are employed, have the threads therein disposed obliquely to the respective opposed edges such that when the reinforcing section 11 is finally formed, substantially the ends of the threads will be exposed to the wearing surfaces of the packing.

In fabricating the reinforcing section of the packing of the present invention, numerous fabrics may be employed. In general, the term fabric, as used herein, refers to any material obtained by weaving or other such techniques wherein the matrix of the material consist of a lattice work or web of threads. Numerous materials fall into this class such as for example, cotton, asbestos, fiber glass, nylon polyesters, linen, and the like. The fabric may be of the natural type such as cotton, asbestos, or linen, of the synthetic type such as nylon, polyester or other such woven synthetic polymeric materials or of blends of natural and synthetic types such as cotton-polyester, rayon-polyester, etc. In general, the fabrics which form the reinforcing section of the packings herein should be of such a nature that they have a minimum tendency to stretch, give, or flow when subjected to heat. It will be apparent that if the fabric layer comprises a material which has excessive thermoplastic characteristics, i.e., which flows too easily under heat, that it will not form an effective backup or reinforcement for the resilient sealing portion of the packing. This property of the reinforcing section is to be contrasted with that of the resilient sealing section which can be made of a thermoplastic material since a certain amount of flow is desirable in order to effect efficient sealing by the packing.

Generally speaking, the fabric or strips thereof are impregnated with a material or agent (bonding agent)

which is capable of molding to shape when heated and after cooling of retaining such shape and of bonding the respective layers or convolutions of the strip together when the reinforcing section is formed. However, it is not necessary that the cloth be impregnated prior to forming the reinforcing section. The reinforcing section can be first formed by winding a strip into a helix of desired thickness and then spraying a bonding agent having the above properties onto the helix. Alternately the fabric helix can simply be immersed in a bath of the desired bonding agent. The bonding agent will most generally take the form of a synthetic or natural rubber or other such elastomer having the above described characteristics. Such materials when heated will tend to flow but when cooled will mold to the shape desired and will generally retain such shape. As non-limiting examples of suitable elastomers there may be mentioned styrene-butadiene polymers, polybutadiene, neoprene, butyl, polyisoprene, nitrile rubber, ethylene-propylene rubbers, and the like. These materials and many similar ones, when impregnated into the fabric will cause the fabric layer or convolutions to bond together if adequate pressure and heat are applied to cause these elastomers to flow.

In manufacturing the packings of the present invention, the resilient sealing section and the fabric reinforcing section are generally formed separately and then the two sections bonded together to form an integral packing of the desired cross-sectional configuration. The resilient sealing section can be fashioned in many different ways such as cutting the desired thickness of ring from a tube of suitable resilient material molding the resilient section directly or even by taking strips of a suitable resilient material cutting them to the desired length and then forming them into a circle by joining the respective ends of the strip.

To form the reinforcing section of the packing, a strip of the fabric, assuming only one fabric is to be employed, is formed into a helix or coil with the convolutions superimposed upon one another. As will be observed, by this method a continuous, joint free section is formed. When a helix or coil of suitable thickness has been made, the layers are then bonded together by subjecting the section to pressure and heat in the presence of a suitable bonding agent as described above. Generally, it is preferable that the fabric or fabrics as the case may be, be impregnated with the desired adhesive or impregnating agent such that once the helix is formed, it is simply heat and pressured treated so as to bond the convolutions together into an integral section. Once the reinforcing section has been formed, the sealing section and the reinforcing section are then bonded together by heat and pressure treatment of the two sections together causing the impregnating or bonding agent of the reinforcing section to bond to the resilient section. If desired, a separate adhesive layer can be included between the reinforcing section and the resilient sealing section in order to facilitate and aid in the bonding of the two sections. The temperatures and pressures required to effect the bonding will of course vary and depend upon the particular materials employed in the resilient section and the bonding agent in the reinforcing section.

Figure 6:
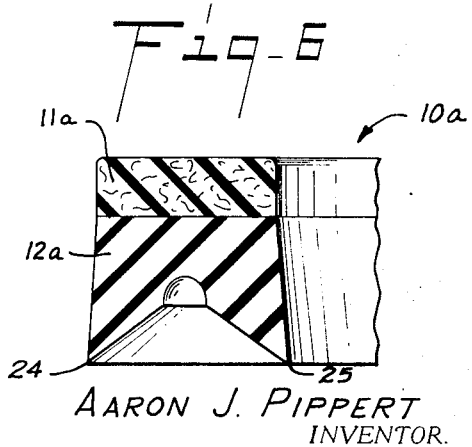
FIG. 6 is a cross-sectional view similar to FIG. 1 showing a packing having two sealing lips.

It is to be understood, that packings constructed in accordance with the present invention, may be made of various and sundry shapes depending on how the packing is to be used. For example, in FIG. 6, there is shown a modified version of a packing in which there are two sealing lips 24 and 25, sealing lip 24 extending radially outward from the packing and sealing 25 extending radially inward from the packing. As in the case of sealing ring 10 shown in FIG. 1, the reinforcing section 11a and resilient sealing section 12a of packing 10a are constructed as described above.

It has been found that packings employed in slush pumps and constructed in accordance with the present invention, have better wearability, breathe better, and are more resistent to extrusion of the resilient sealing section than prior art packings. As explained above, and as best seen in FIG. 4, since substantially the ends of the threads are exposed to the wearing surfaces of the packing, there is no sloughing off of threads which are running tangentially to the wearing surfaces so as to effect uneven wearing of the packing at 90° intervals. This of course results in even wearing of the packing thus increasing the life of the packing and substantially reducing maintenance cost on slush pumps and other such systems. Furthermore, the use of strips of fabric to form the reinforcing section results in a considerable savings in material thus reducing the manufacturing cost.

I claim:

1. A packing comprising
    an annular body having a sealing section and a reinforcing section,
    said sealing section comprising a resilient material and having at least one sealing lip thereon,
    said reinforcing section comprising at least one fabric and formed from superimposed, convolutions of a strip of said fabric, said convolutions being bonded together, the threads of said strip being disposed obliquely to the opposed edges of said strip, said sealing section and said reinforcing section being bonded together to form said annular body.

2. The packing of claim 1 wherein said reinforcing section comprises a plurality of fabrics formed from separate strips of said fabrics.

3. The packing of claim 1 wherein said fabric is impregnated with an agent capable of molding to shape when heated and after cooling of retaining such shape and of bonding together said convolutions.

4. The packing of claim 1 wherein said fabric is selected from the group consisting of cotton, asbestos, nylon, polyester, fiber glass, and linen.

5. The packing of claim 1 wherein said resilient material comprises a synthetic polymeric material.

6. The packing of claim 1 wherein said resilient material comprises a natural polymeric material.

7. The packing of claim 1 wherein said sealing lip projects radially outward from said packing.

8. The packing of claim 1 wherein said sealing section has two sealing lips thereon, one of said sealing lips projecting radially outward from said annular body, the other of said sealing lips projecting radially inward from said annular body.

* * * * *